May 28, 1957  K. SCHWARTZWALDER ET AL  2,793,956
SODIUM SILICATE TYPE CEMENT
Filed March 25, 1952
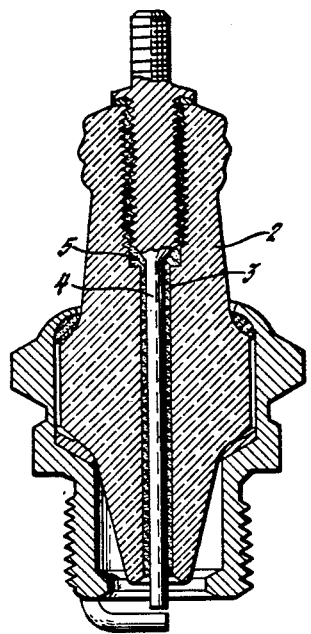
Inventors
Karl Schwartzwalder &
Curtis D. Ortman
By Willits, Helwig & Baillio
Attorneys

United States Patent Office 2,793,956
Patented May 28, 1957

2,793,956
SODIUM SILICATE TYPE CEMENT

Karl Schwartzwalder, Holly, and Curtis D. Ortman, Swartz Creek, Mich., assignors to General Motors Corporation, Detroit, Mich., a corporation of Delaware Application March 25, 1952, Serial No. 278,417

4 Claims. (Cl. 106—82)

This invention relates to a new composition of matter useful as a cement for ceramics, metals and other materials. More particularly, the invention relates to a cement composition employing waterglass as a constituent and especially suitable for use on spark plugs.

Spark plugs are generally produced by first shaping the ceramic insulators so as to provide a bore therethrough and then securing in the insulator bore a centerwire to serve as the central electrode of the spark plug. The centerwire is usually secured by applying a cement or sealing composition between the wire and the insulator and then drying and heating the assembly to harden the cement, thus anchoring the centerwire and forming a leakproof or gas-tight seal. Because of the relatively high pressures encountered by spark plugs, and because it is essential that they be gas-tight, the cement must be such that it will bond tightly to the insulator and to the centerwire and form a seal which is durable and resistant to mechanical shock and cracking and other failures.

A cement which has been suggested for use as a spark plug sealing composition is that consisting of a mixture of pulverized clay or other ceramic material and sodium silicate, commonly known as waterglass. This composition, however, is not completely satisfactory because of the numerous failures due to the development of leaks during the operation of the plugs. Oftentimes the seal formed by these waterglass type cements fails during the heating or drying step of the manufacturing process and prior to the actual operation of the plugs.

It is an object of this invention to provide a sealing composition which forms a tenacious bond with metal and ceramic and which forms a heat-proof seal having increased durability and resistance to mechanical shock and high pressures.

Another object is the provision of an improved silicate bound type cement particularly suitable for use on the spark plugs.

These objects are carried out in accordance with the invention by incorporating into a sodium silicate cement a small amount of lard oil. Thus, the compositions of this invention consist generally of a mixture of finely pulverized ceramic or inert material, a syrupy liquid waterglass and lard oil (oleum Adipis).

The invention is not limited to the use of any particular ceramic; however, we have found that materials selected from the group consisting of calcined clay (calay), alumina, magnesium silicate (talc), zircon and mixtures thereof, are particularly suitable for spark plug centerbore sealing cements. For example, calcined Georgia kaolin and tabular corundum, either alone or in mixture, serve excellently as the ceramic body forming ingredient of our improved compositions. The cement may contain from about 40 to 70% of the selected pulverant ceramic material.

The waterglass may be of any of a variety of types. It is preferable, however, to use a sodium silicate which has a soda-silica ratio of from 1 to 2 to 1 to 3. Some examples of commercially available sodium silicates, which will serve excellently in the compositions of this invention, are a liquid sodium silicate which has a soda-silica ratio of about 1 to 2.4 and a density of about 52° Baumé at 68° F. and a liquid sodium silicate which has a soda-silica ratio of about 1 to 2.0 and a density of about 59° Baumé at 68° F. Of course, mixtures of various liquid sodium silicates may also be used. The viscosity of the finished cement will depend upon the solids to water ratio in the liquid sodium silicate. For spark plug sealing cements, we prefer to use a sodium silicate having a solids to water ratio sufficient to impart a density from 50° to 60° Baumé measured at 68° F. At this density the solution contains from about 40 to 60% solids. It is to be understood that the term "waterglass," as used herein, includes not only sodium silicate but also potassium silicate and mixtures of potassium and sodium silicates commonly referred to as "double waterglass." The amount of liquid waterglass used in the cement may vary from 30 to 60% by weight.

While the cement may contain from about .5 to 5% by weight lard oil, we prefer to use a composition containing about three parts by weight of lard oil for every 100 parts by weight of ceramic-liquid waterglass mixture.

In the preferred compositions we use about 52 parts by weight of pulverant ceramic, about 48 parts by weight liquid waterglass (from 50° to 60° Baumé at 68° F.) and about 3 parts lard oil. The following examples of specific compositions having this preferred composition will serve to illustrate:

Example I

| | Parts by weight |
|---|---|
| Tabular corundum | 52 |
| Liquid sodium silicate (52° Baumé) | 48 |
| Lard oil | 3 |

Example II

| | Parts by weight |
|---|---|
| Calcined clay | 42 |
| Tabular corundum | 10 |
| Liquid sodium silicate (52° Baumé) | 48 |
| Lard oil | 3 |

To prepare these compositions, the lard oil is first incorporated into the liquid sodium silicate until a uniform mixture is accomplished. Then the pulverized ceramic ingredient is thoroughly mixed into the liquid until a soft, creamy, viscous cement, free from lumps, is attained. If the cement is too viscous, additional water may be added and mixed into the batch. The desired viscosity will of course depend upon the particular use for which the cement is being formulated. We have found that a 52° Baumé (at 68° F.) sodium silicate solution serves excellently to yield a cement with a consistency suitable for use in sealing spark plug centerwires.

The insulator, after having had the centerwire cemented in place in the centerbore, is air dried for about 48 hours and then oven-dried for about 72 hours at temperatures of from about 200° to 240° F. During this drying operation a portion of the water evaporates, thus increasing the viscosity of the cement to prevent its boiling out of the insulator during operation of the plug at the relatively high engine temperatures encountered. However, sufficient water is retained by the cement to prevent brittleness and leakage.

In the accompanying drawing there is shown a finished spark plug having a ceramic insulator 2 provided with a longitudinally extending centerbore 3 in which is located the metal centerwire 4 of any desired shape. Between the centerwire 4 and the walls of the centerbore 3 is the sealing cement 5 of this invention.

It is to be understood that the specific spark plug structure shown is merely for purposes of illustration and that the cement 5 may be used with other types of insulator and centerwire design. Often, for example, the centerwire will consist of a plurality of separate units including resistors, conducting seals, etc., in which case the cement may be used to secure and seal any desired section or unit of the centerwire.

By the use of improved cement of this invention, a seal with increased resistance to cracking and with increased and more durable sealing properties is attained. It is believed that the lard oil lessens the tendency of the waterglass to form a skin or crust on its surface. Such a skin as usually forms on the surface of waterglass type cements prevents the orderly and gradual escape of water vapor during drying and also during spark plug operation. As a result, high vapor pressures develop within the cement and cause fracture or a cracking of the seal and, in some instances cause the cement to boil out of the end of the insulator. However, in the compositions of this invention, the silicate "skinning" is greatly reduced, thus allowing the gradual escape of water vapor during the drying step in the manufacture of the plugs and during spark plug operation when relatively high temperatures are often encountered. The lard oil not only prevents seal fracture but also imparts superior sealing properties to the cement by lessening its tendency to become brittle. Normally, upon the evaporation of moisture from the cement, leaks begin to develop. When lard oil is used, the temperature and time required to produce this leakage are both greatly increased.

We have found that liquid silicones in some instances may be substituted for the lard oil and also serves to enhance the sealing properties and durability of waterglass cements. However, because of its relatively low cost, we prefer to use lard oil.

Various changes and modifications of the embodiments of the invention described herein may be made by those skilled in the art without departing from the spirit and principles of the invention.

We claim:

1. A spark plug sealing cement consisting essentially of about 52 parts by weight tabular corundum, about 3 parts by weight lard oil, and about 48 parts by weight liquid sodium silicate having a soda-silica ratio of from about 1 to 2 to about 1 to 3, and a viscosity of from about 50° to 60° Baumé.

2. A spark plug sealing cement consisting essentially of about 42 parts by weight calcined clay, about 10 parts by weight tabular corundum, and 3 parts by weight lard oil, and about 48 parts by weight liquid sodium silicate having a soda-silica ratio of from about 1 to 2 to about 1 to 3, and a viscosity of from about 50° to 60° Baumé.

3. A spark plug sealing cement consisting essentially of about 40% to 70% pulverant ceramic body forming material selected from a group consisting of alumina, talc, calcined clay, zircon and mixtures thereof, about .5% to 5% lard oil and about 30% to 60% liquid waterglass having a soda-silica ratio of from about 1 to 2 to about 1 to 3 and a viscosity of from about 50° to 60° Baumé.

4. A spark plug sealing cement consisting essentially of about 40% to 70% of a mixture of calcined clay and alumina, about .5% to 5% lard oil, and about 30% to 60% liquid waterglass having a soda-silica ratio of from about 1 to 2 to about 1 to 3 and a viscosity of from about 50° to 60° Baumé.

References Cited in the file of this patent

UNITED STATES PATENTS

| | | |
|---|---|---|
| 2,393,497 | Gregory | Jan. 22, 1946 |
| 2,533,118 | Kahn | Dec. 5, 1950 |
| 2,616,407 | Thomas | Nov. 4, 1952 |

FOREIGN PATENTS

| | | |
|---|---|---|
| 19,013 | Sweden | Feb. 18, 1905 |
| 415,186 | France | Sept. 20, 1910 |
| 542,674 | Germany | Jan. 28, 1932 |

OTHER REFERENCES

Ceramic Industry, January 1945, page 69.